US009550291B2

(12) United States Patent
Techlin

(10) Patent No.: US 9,550,291 B2
(45) Date of Patent: Jan. 24, 2017

(54) GRIP FOR GENERALLY ROD SHAPED OBJECTS

(71) Applicant: O.D.G. Holdings, LLC, Appleton, WI (US)

(72) Inventor: Aaron Techlin, Appleton, WI (US)

(73) Assignee: O.D.G. HOLDINGS, LLC, Appleton, WI (US)

( * ) Notice: Subject to any disclaimer, the term of this patent is extended or adjusted under 35 U.S.C. 154(b) by 0 days.

(21) Appl. No.: 14/887,815

(22) Filed: Oct. 20, 2015

(65) Prior Publication Data

US 2016/0121476 A1    May 5, 2016

Related U.S. Application Data

(60) Provisional application No. 62/072,505, filed on Oct. 30, 2014.

(51) Int. Cl.
*B25G 1/10* (2006.01)
*A01K 87/08* (2006.01)
*B25G 3/00* (2006.01)
*B05C 17/02* (2006.01)

(52) U.S. Cl.
CPC .............. *B25G 1/102* (2013.01); *A01K 87/08* (2013.01); *A01K 87/085* (2013.01); *B05C 17/0205* (2013.01); *B25G 3/00* (2013.01); *Y10T 16/4713* (2015.01)

(58) Field of Classification Search
CPC .... Y10T 16/4713; Y10T 16/466; Y10T 16/44; Y10T 16/469; A01K 87/08; A01K 87/085; B25G 1/102; B25G 3/00; F41C 23/16; B05C 17/0205; A01B 1/026

USPC ...... 16/426, 421, 110.1, 422; 294/58; 43/25; 42/72; 492/13
See application file for complete search history.

(56) References Cited

U.S. PATENT DOCUMENTS

| | | | | | |
|---|---|---|---|---|---|
| 1,945,430 | A | * | 1/1934 | Garrett .................... | A01B 1/225 16/426 |
| 2,761,236 | A | * | 9/1956 | Gaston .................... | A01K 87/08 43/25 |
| 3,341,235 | A | * | 9/1967 | Mattson .................. | A01D 34/84 16/426 |
| 3,466,078 | A | * | 9/1969 | Sholund ................... | A01B 1/22 16/426 |
| 4,041,635 | A | * | 8/1977 | Savage .................... | A01K 87/08 43/25 |
| 4,881,294 | A | * | 11/1989 | Riedl ....................... | B25F 5/003 16/426 |
| 5,581,931 | A | * | 12/1996 | Swisher .................. | A01K 87/08 43/21.2 |
| 5,695,231 | A | * | 12/1997 | Hoffman ................. | A01B 1/026 16/426 |

(Continued)

*Primary Examiner* — William Miller
(74) *Attorney, Agent, or Firm* — Graham Curtin, P.A.

(57) ABSTRACT

A detachable grip is provided with bracket system that can be removably attached to a desired location along the length of a fishing rod, and that has a removable grip which attaches to the bracket. More particularly, in one embodiment the bracket girdles the fishing rod using bolts to fasten a top half of the bracket to the bottom half of the bracket. In one or more embodiments, the grip attaches to the bracket and extends in a direction away from the bracket that is substantially in a direction perpendicular to the rod. In one embodiment, the grip is attached to the bracket by a bolt, and is adapted to allow the grip to be readily detached.

18 Claims, 7 Drawing Sheets

(56) References Cited

U.S. PATENT DOCUMENTS

| | | | | |
|---|---|---|---|---|
| 6,237,274 B1 * | 5/2001 | Head | ............ | A01K 87/08 43/25 |
| 7,014,232 B2 * | 3/2006 | Bosa | ............ | A01B 1/026 16/426 |
| 7,454,858 B2 * | 11/2008 | Griffin | ............ | F41C 23/16 42/71.01 |
| 7,707,766 B2 * | 5/2010 | Millen | ............ | A01K 87/08 16/110.1 |
| D732,138 S * | 6/2015 | Wooley | ............ | D22/147 |

* cited by examiner

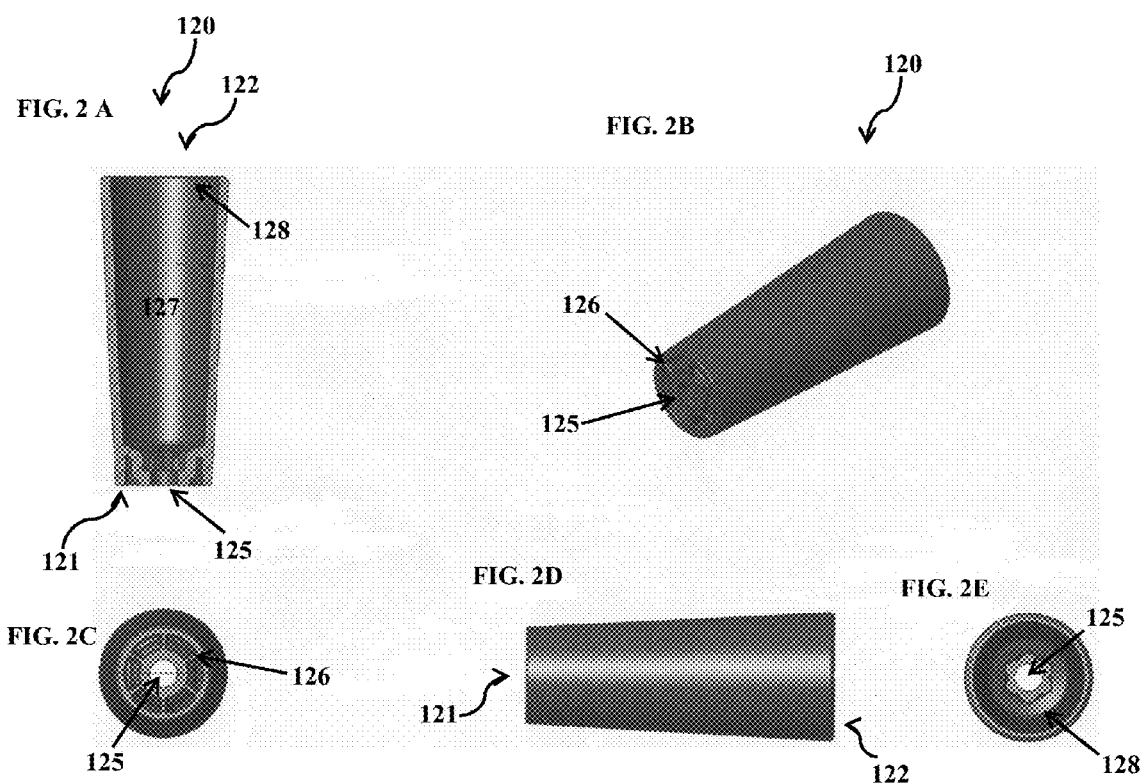

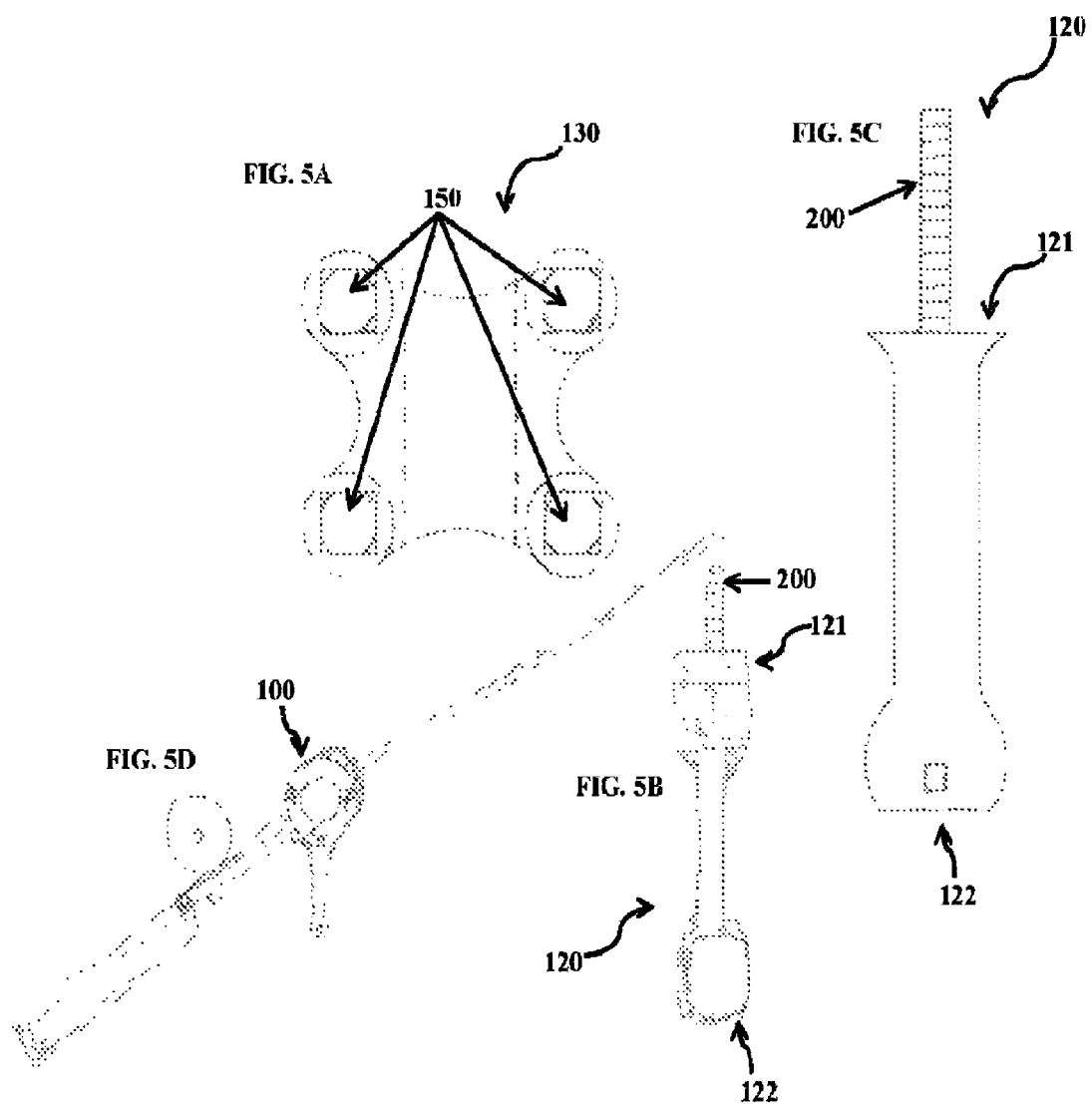

GRIP FOR GENERALLY ROD SHAPED OBJECTS

RELATED APPLICATIONS

This application claims the benefit of U.S. Provisional Application No. 62/072,505, the contents of which are hereby incorporated by reference in their entirety.

BACKGROUND

The present invention relates to fishing rod grips in general, and more particularly to fishing rod grips that project in a direction substantially perpendicular and away from the fishing rod.

Anglers must often continuously hold a fishing rod by hand over long periods of time while waiting for a fish to strike. Since the typical fishing rod is linear, and the tip of the rod must be pointed in the general direction of the water, the angler is forced to hold the rod with a rotated or bent wrist. Over time, this contortion of the wrist can cause discomfort, fatigue or injury. Furthermore, the potential for discomfort, fatigue or injury to the wrist is exacerbated when a fish strikes and the angler must maintain a strong grip on the rod, or when the angler must make a repeated motion involved in casting a lure. Altogether, fishing for long periods of time can place a substantial strain on the wrist, arm, neck, back and shoulders of the angler. Several rod configurations have been proposed to ameliorate these risks, but there remains a need for improvement.

A grip that extends in a perpendicular direction from a fishing rod is useful for the angler's handling of a fishing rod, and may reduce the potential for wrist discomfort, fatigue, or injury. However, such an extension becomes a hindrance to storage when a fishing rod is not in use and can interfere with an angler carrying multiple fishing rods at the same time. Moreover, the placement of a perpendicular extension may be useful for some types of fishing, but may be a hindrance for other types of fishing. Thus, there is a need for an improved vertical extension grip that can both reduce the potential for wrist injury, while also being easily removed when not in use and easily repositioned for alternative types of fishing.

Other generally rod-shaped objects must be held by hand and similarly pose the potential for bodily fatigue or injury. Thus, there is a need for an improved grip for holding generally rod shaped objects.

SUMMARY OF THE INVENTION

The invention described herein overcomes the deficiencies of current fishing rod designs with respect to the positioning of the angler's wrist, and overcomes handling and storage problems of vertical grips when the rod is not in use. Among other things, the present invention provides various fishing rod grips that are removably attachable to a fishing rod.

One or more embodiments of the present invention provides a top half of a bracket and a bottom half of a bracket that are adapted to girdle a fishing rod. Either the top half or bottom half or both are attached to a grip that projects substantially perpendicularly from the length of the girdled rod. Specifically, one or more embodiments may comprise a grip having a top and a bottom. The top of the grip may be adapted to receive a bolt having a first end and a second end. The top half of a bracket may have a substantially concave form defining a first interior area substantially in the shape of a half-cylinder. The bottom half of the bracket may have a substantially concave form defining a second interior area substantially in the shape of a half-cylinder. The top half and the bottom half of the bracket may be reversibly mated, with the flat part of the first interior area junctioning with the flat part of the second interior area to form a single interior area substantially in the shape of a cylinder. This interior area is the space around which the fishing rod grip may girdle the rod. The top of the grip may be reversibly mated with a first end of a bolt and either the top half or the bottom half are reversibly mated with the second end of the bolt. Thus, the present invention provides a means for both attaching a fishing rod grip in a desired position along the length of a rod, and also provides a means for easily attaching and removing a grip to the mated bracket halves girdling the rod.

In other embodiments, the fishing rod grip of the present invention may comprise a top half defining one or more individual through-holes and a bottom half defining one or more individual receptor holes. The one or more individual through-holes may line up directly with the individual receptor holes and may be adapted to receive a threaded end of a bolt. In this manner, the top half and the bottom half may be held in a mated position girdling a fishing rod by screwing a bolt in place through the top half into the bottom half, thereby pinching the fishing rod between. The benefits of this system are that the fishing rod grip may be placed at any point along the length of a fishing rod.

In other embodiments, the fishing rod grip of the present invention may comprise a top half defining through-holes that are low-relief. In this manner, the head of a bolt would be below the upper surface of the top half, when the top half and the bottom half are reversibly bolted together. This type of debossed though-hole prevents an angler's hand or other material from getting scratched, or prevents any other material getting entangled by the head of the bolt.

In one or more embodiments, a flexible material may be attached to the concave side of the top half and bottom half of the bracket. This material may enhance the clenching of the top half and bottom half around the fishing rod when in a mated position. Furthermore, a grasp enhancing material may be attached to the outer surface of the grip. This material can serve the purpose of both helping the angler to keep a grasp on the grip and also provide additional comfort.

In one or more embodiments, the grip of the fishing rod grip may have a frustoconical shape and also define an interior space. The grip may further comprise interior support beams to enhance its strength. Other grip shapes and structures are possible, however, including a solid or hollow cylinder shape or hour-glass shape, among others.

Similarly, one or more embodiments of the bracket aspect of the invention may be formed into a variety of hollow or solid shapes. In some embodiments, the top half and the bottom half may be adapted to girdle a fishing rod.

The top half, bottom half, and the grip may optionally be made of steel, wood, plastic, aluminum, hardened rubber, graphite, thermoplastics, hybrid mixtures of metal and composites, or any other substantially stiff material.

While some embodiments of the invention described herein may be adapted to girdle a fishing rod, other embodiments of the invention may be adapted to girdle other rod-shaped objects which are used in a manner involving push, pull or lift motions. For example, some embodiments of the present invention may be adapted to girdle brooms, shovels, rakes, hoes, tampers, picks, axes, crowbars, pry bars, tree pruners, fruit pickers, sidewalk scrapers, paint roller poles, post-hole diggers, pole saws, sickles, grass hooks, pitch forks, garden tillers, ground aerator, root irrigators, and the like. By way of non-limiting, specific example, one or more embodiments of the invention may be adapted to girdle the forestock (fore-end) or barrel of a riffle. The description of various embodiments of the present invention as being adapted to girdling a fishing rod should not be read as limiting the invention to those particular configurations.

BRIEF DESCRIPTION OF DRAWINGS

FIG. 2A illustrates a cross sectional side view of one embodiment of the grip part of the present invention.

FIG. 2B illustrates a perspective view of one embodiment of the grip part of the present invention.

FIG. 2C illustrates a top view of one embodiment of the grip part of the present invention.

FIG. 2D illustrates a side view of one embodiment of the grip part of the present invention.

FIG. 2E illustrates a bottom view of one embodiment of the grip part of the present invention.

FIG. 5A illustrates a cross sectional top view of the bracket part of the present invention.

FIG. 5B illustrates a side view of one embodiment of the grip part of the present invention.

FIG. 5C illustrates a side view of another embodiment of the grip part of the present invention.

FIG. 5D illustrates a perspective view of one embodiment of the present invention attached to a typical linear fishing rod.

DETAILED DESCRIPTION

Figure 1:
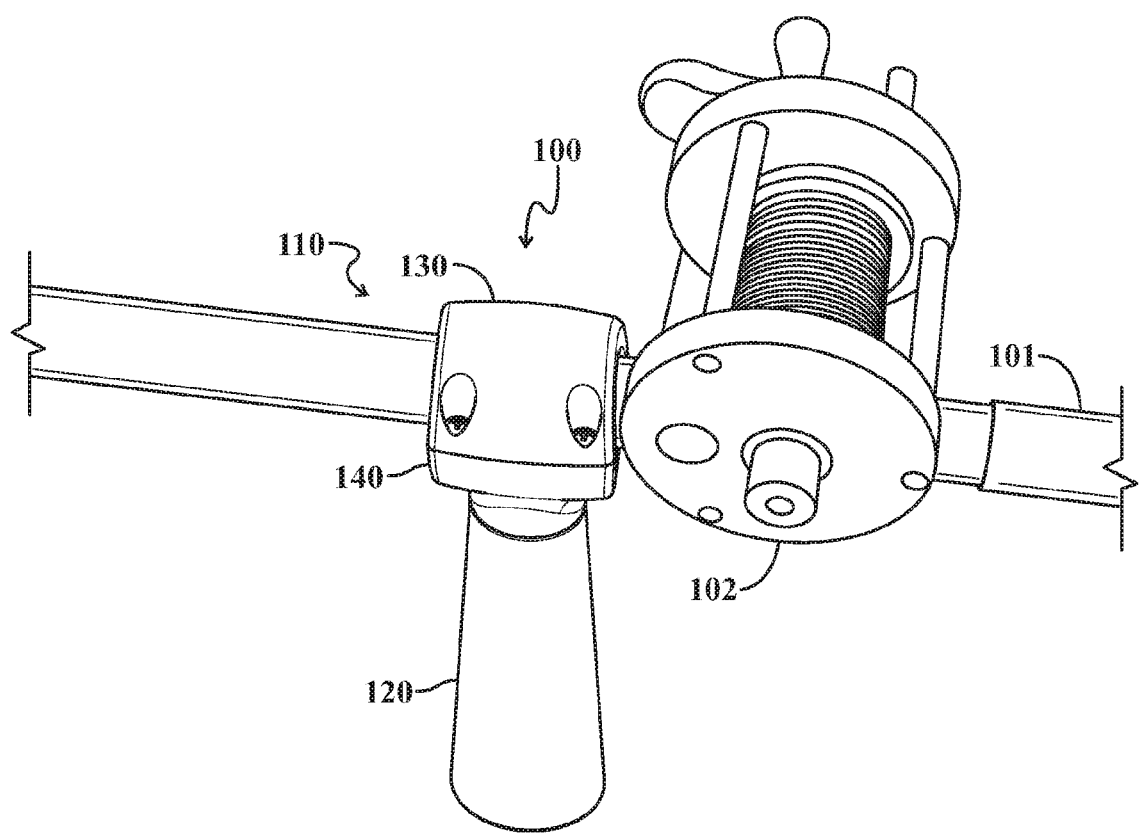
FIG. 1 illustrates a perspective view of one embodiment of the present invention attached to a typical linear fishing rod.
Figure 3A:
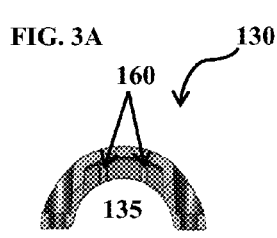
FIG. 3A illustrates a cross sectional side view of one embodiment of the top half of the bracket part of the present invention.
Figure 3B:
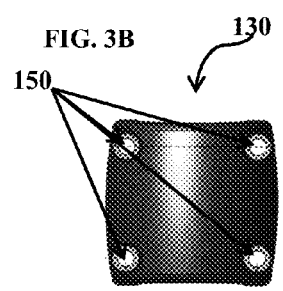
FIG. 3B illustrates a top view of one embodiment of the top half of the bracket part of the present invention.
Figure 3C:
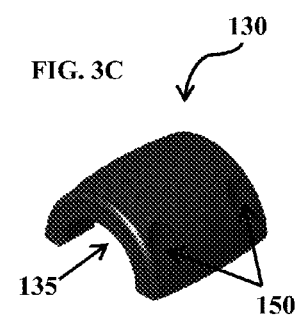
FIG. 3C illustrates a perspective view of one embodiment of the top half of the bracket part of the present invention.
Figure 3D:
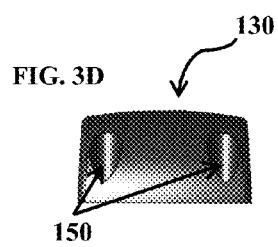
FIG. 3D illustrates a side view of one embodiment of the top half of the bracket part of the present invention.
Figure 3E:
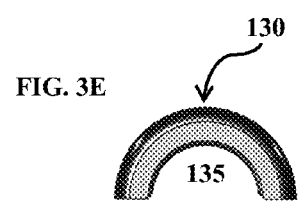
FIG. 3E illustrates another side view of one embodiment of the top half of the bracket part of the present invention.
Figure 3F:
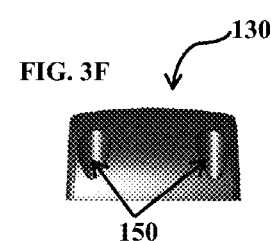
FIG. 3F illustrates another side view of one embodiment of the top half of the bracket part of the present invention.
Figure 3G:
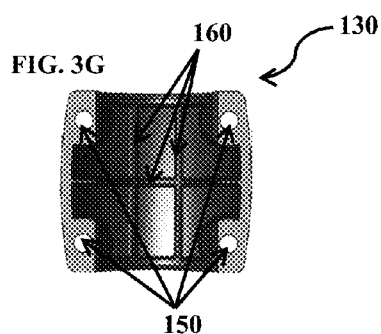
FIG. 3G illustrates a bottom view of one embodiment of the top half of the bracket part of the present invention.
Figure 4A:
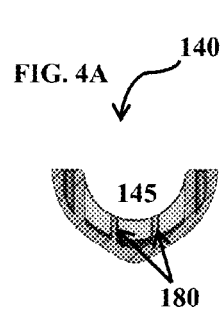
FIG. 4A illustrates a cross sectional side view of the bottom half of one embodiment of the bracket part of the present invention.
Figure 4B:
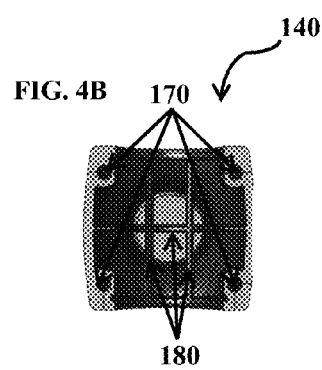
FIG. 4B illustrates a top view of the bottom half of one embodiment of the bracket part of the present invention.
Figure 4C:
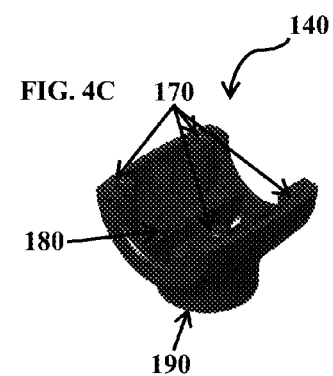
FIG. 4C illustrates a perspective view of the bottom half of one embodiment of the bracket part of the present invention.
Figure 4D:
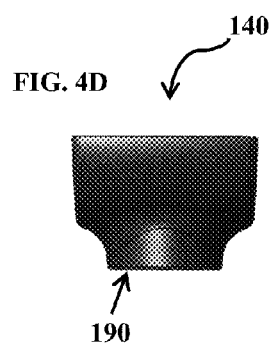
FIG. 4D illustrates another side view of the bottom half of one embodiment of the bracket part of the present invention.
Figure 4E:
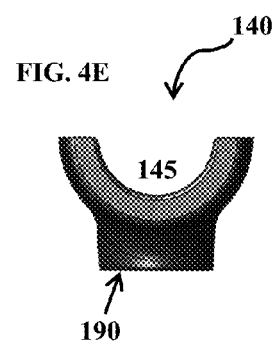
FIG. 4E illustrates another side view of the bottom half of one embodiment of the bracket part of the present invention.
Figure 4F:
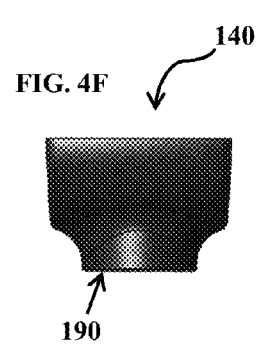
FIG. 4F illustrates another side view of the bottom half of one embodiment of the bracket part of the present invention.
Figure 4G:
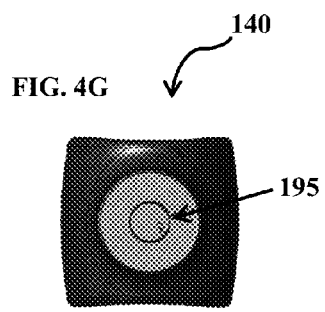
FIG. 4G illustrates a bottom view of the bottom half of one embodiment of the bracket part of the present invention.

This disclosure describes the best mode or modes of practicing the invention as currently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 shows an exemplary and non-limiting example of one embodiment of the fishing rod grip 100 of the invention. FIG. 1 illustrates a perspective view of a fishing rod grip 100 comprising a bracket 110 and a grip 120 as attached to a typical linear fishing rod 101. Specifically, the fishing rod grip 100 is attached via the bracket 110 which girdles the linear fishing rod 101. In this particular embodiment, the fishing rod grip 100 is attached to the rod 101 in a proximal position above the reel 102. In other embodiments of the present invention, the fishing rod grip 100 may be attached to the linear rod 101 in a position proximally below the reel 102. In yet other embodiments the fishing rod grip 100 may be attached to the fishing rod 101 and distal position below, or a distal position above, the reel 102. In the particular embodiment illustrated in FIG. 1, the grip 120 of the fishing rod grip 100 is positioned trans-to the reel 102. In other words, in the embodiment seen in FIG. 1, the grip 120 is positioned on the far-side of the reel 102 on the fishing rod 101. Other embodiments of the grip 120 of the present invention 100 may be positioned cis-to the reel. In yet other embodiments, the grip 120 may be at any other position of rotation relative to the reel 102 around the linear fishing rod 101.

In another embodiment of the invention, the bracket 110 comprises an attached flexible material that contacts the fishing rod 101 while the bracket 110 girdles the rod. This flexible material can be composed of any padding or other material that is capable of being deformed or bent without breaking, and is adapted to accommodate girdling of fishing rods of varying diameters by the bracket 110. The flexible material is located substantially inside of the concave portions of the bracket, in a position between the bracket and the fishing rod.

In one or more embodiments, the bracket 110 and the grip 120 of the fishing rod grip 100 comprises a substantially inflexible material. For example, in one embodiment, the bracket 110 and the grip 120 are composed of stainless steel. Other substantially inflexible materials may be used as well, including plastic, aluminum, wood, hardened rubber, graphite, thermoplastics, hybrid mixtures of metal and composites.

One or more embodiments of the present invention employ a bracket 110 that is comprised of a top half 130 and a bottom half 140. As can be seen in FIGS. 3 A, B, and E, one or more embodiments of the top half 130 may have a form that defines an interior space 135. In one embodiment, the interior space 135 is substantially in the shape of a half-cylinder, and is adapted to having a width at its widest that is substantially the same as the cross sectional diameter of a fishing rod. As seen in FIGS. 3 B and G, some embodiments of the top half 130 of the bracket 110 may have a substantially square shape when viewed from above. As can be seen in FIGS. 3 B, D, F, and G, one or more embodiments of the top half 130 of the bracket 110 may be adapted to define one or more through-holes 150. There are four separate though holes 150; each one located in a position that is substantially in the corners of a substantially square-shaped top half 130 of the bracket 110 when viewed from above. Other embodiments of the top half 130 of the bracket 110 of the present invention may comprise more than four, or less than four, through-holes 150.

As seen in FIGS. 3 A-G, the through-holes 150 may be partially or fully debossed in the top half 130 of the bracket 110. Debossed through-holes are oriented in a position that is perpendicular to the flat part of the half-cylinder interior space 135 that is defined by the top half 130. In other embodiments, however, debossed through-holes 150 may be oriented at various other angles relative to the flat part of the half-cylinder interior space 135, or oriented at various other angles relative to each other. In various embodiments, the through-holes 150 of the top half 130 may be adapted to allow the shank of a screw or bolt of varying sizes to substantially pass through the through hole 150.

As seen in FIGS. 3 A and G, the top half 130 of the bracket 110, may be comprised of one or more support beams 160. These support beams 160 may be continuous with the rest of the top half 130, or may be separate structures that are attached to the top half 130. As seen in FIGS. 3 A and G, in one embodiment, the support beams 160 are adapted to support the structure of the top half 130 by resisting bending stresses from a direction perpendicular to the support beam 160 length. Any substantially inflexible material may comprise the support beams 160 such as stainless steel, plastic, aluminum, wood, hardened rubber, graphite, thermoplastics, hybrid mixtures of metal and composites. In the embodiment illustrated in FIGS. 3 A and G, there are two parallel support beams 160 perpendicular to a single support beam 160. However, in various embodiments, the top half 130 may comprise one or more support beams 160 oriented at various other positions relative to each other.

As can be seen in FIGS. 4 A, C, and E, one or more embodiments of the bottom half 140 of the bracket 110 have a form that defines an interior space 145. The interior space 145 is substantially in the shape of a half-cylinder and is adapted to have a width at its widest point that is substantially the same as the cross sectional diameter of a fishing rod. Some embodiments of the bottom half 140 of the bracket 110 may have a substantially square shape when viewed from above (FIG. 4 b) or below (FIG. 4 g). As seen in FIGS. 4 A, B, and C, the bottom half 140 may be adapted to define one or more receptor holes 170. The receptor holes 170 are adapted to receive the shank of a bolt or screw. There are four separate receptor holes 170; each hole 170 located in a position that is substantially in the corners of a substantially square-shaped bottom half 140 of the bracket 110. Other embodiments of the bottom half 140 of the bracket 110 of the present invention may comprise more than four or less than four receptor holes 170. Receptor holes 170 are oriented in a position that is perpendicular to the flat part of the semi-circle interior space 145 that is defined by the bottom half 140. In other embodiments, however, receptor holes 170 may be oriented at various other angles relative to the flat part of the semi-circle interior space 145, or oriented at various other angles relative to each other.

As seen in FIGS. 4 A and B, the bottom half 140 of the bracket 110, may be comprised of one or more support beams 180. These support beams 180 may be continuous with the rest of the bottom half 140, or may be separate structures that are attached to the bottom half 140. As seen in FIGS. 4 A and B, the support beams 180 are adapted to support the structure of the bottom half 140 by resisting bending stresses from a direction perpendicular to the support beam 180 length. Any substantially inflexible material may comprise the support beams 180 such as stainless steel, plastic, aluminum, wood, hardened rubber, graphite, thermoplastics, hybrid mixtures of metal and composites. As illustrated in FIG. 4 B, there are two parallel support beams 180 perpendicular to a single support beam 180. However, in various embodiments, the bottom half 140 may comprise one or more support beams 180 oriented at various other positions relative to each other.

As seen in FIGS. 4 C, D, E, and F, the bottom half 140 of the bracket 110, may comprise a projection 190 that extends outwardly from beneath the bottom half 140. In one or more embodiments, the projection 190 is adapted to receive the shank of a bolt or screw. Specifically, the projection 190 may define an empty space 195 which is capable of receiving a bolt or screw.

While some embodiments of the present invention have described the bracket 110 as reversibly girdling a generally rod-shaped object, other embodiments of the bracket 110 may be permanently fixed to the rod-shaped object. In some embodiments, the bracket 110 is permanently built into the generally rod shaped object, with the grip 120 being mateably detachable. Some embodiments may employ bolts or screws to permanently affix the bracket 110 to the generally rod-shaped object, while other embodiments may use adhesives. The description of various embodiments of the bracket 110 as adapted to being reversibly attached should not be read as limiting the invention to those particular configurations.

Figure 6A:
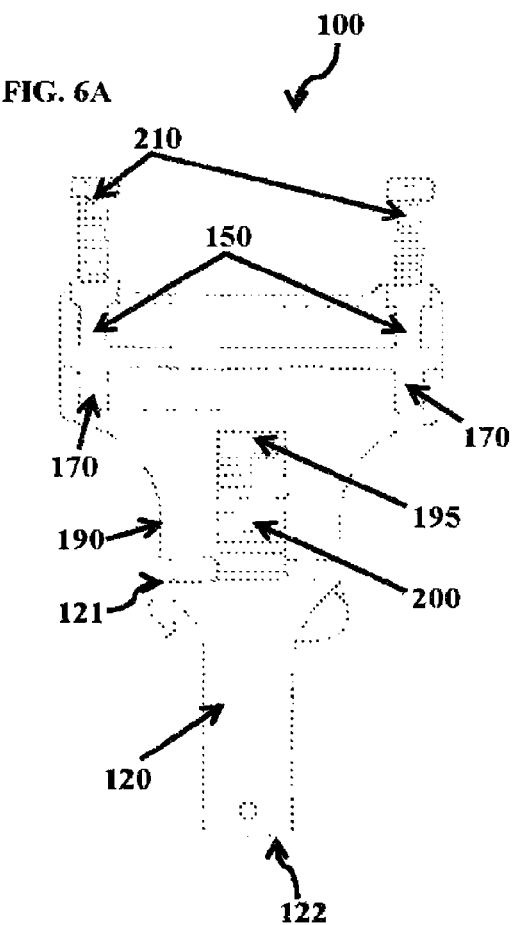
FIG. 6A illustrates a cross sectional side view of a partially assembled embodiment of the present invention.
Figure 6B:
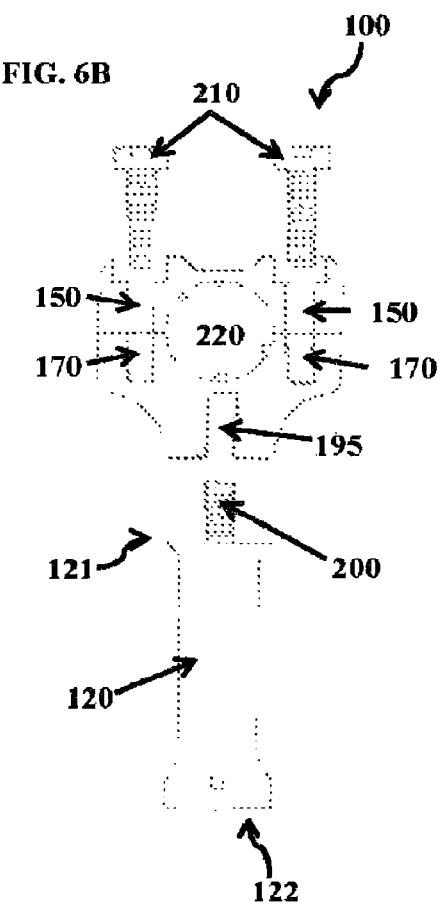
FIG. 6B illustrates another cross sectional side view of one embodiment of a partially assembled fishing rod grip of the present invention.

One or more embodiments of the present invention also comprise a grip 120 which may be detachably connected to the bracket 110. As seen in FIGS. 5 B and C, the grip 120 has a top 121 and a bottom 122, and may comprise a bolt 200 extending vertically from the top 121 of the grip 120. In one embodiment of the invention, the bolt 200 is adapted to be screwed into an empty space 195 defined by the projection 190 (FIG. 6). In some embodiments, the top of the grip 120 is fashioned so as to form a substantially continuous surface between the grip 120 and the projection 190 when the grip 120 and projection 190 are fully mated. As seen in FIGS. 2 A, B, C, D, and E, in some embodiments the grip may have a frustoconical shape. Also, as seen in FIG. 2A, in some embodiments the grip may define a hollow space 127. The grip of the present invention may also have an opening 125 in the top 121 of the grip 120 that is adapted to receive the shank of a bolt of a screw (FIGS. 2 A, C and E). Other embodiments may have a second opening 128 located on the bottom 122 of the grip 120 (FIGS. 2 A and E). The structure of the grip 120 may comprise one or more support beams 126. The support beams 126 may be positioned radially from the center of the opening 125 of the grip 120. In one or more embodiments, the outer surface of the grip 120 may comprise a material that enhances the angler's grip on the grip 120, or enhances the angler's comfort. For example, in one or more embodiments, the outer surface comprises foam padding.

One or more embodiments of the invention may comprise a grip 120 that is adapted to be heated or cooled. For example, one embodiment of the grip 120 may be attached to a heating or cooling element and a power supply. In some embodiments, the grip 120 may define a hollow area that is adapted to receive and retain a battery and a heating or cooling element. In yet other embodiments, the grip 120 may define a hollow area that is adapted to receive a single-use packet containing chemicals for an endothermic or exothermic reaction.

In other embodiments of the present invention, the grip 120 may be adapted to function as a storage space. For example, in some embodiments the grip 120 may define a space adapted to hold fishing lures, and may comprise a removable lid.

Some embodiments of the present invention may comprise a grip 120 that is adapted to being substantially encapsulated by a viscid material. In one or more embodiments, the grip 120 is adapted to receive a viscid sleeve which may permanently or removeably slide or roll onto the grip 120. Other embodiments of the grip 120 may be adapted to adhere to various tacky materials such as tape.

FIGS. 6 A and B illustrate two different cross sectional side views of one embodiment of a partially assembled fishing rod grip 100 of the present invention. As seen in both FIGS. 6 A and B, one or more embodiments of the top half 130 and the bottom half 140 of the bracket 110 are mateable. The through-holes 150 defined by the top half 130 are lined up with the receptor holes 170 defined by the bottom half 140 when the top half 130 is fully mated with the bottom half 140. While mated, a screw 210 may be screwed or inserted through the through-hole 150 and screwed into the hole 170, thereby holding the top half 130 and the bottom half 140 together. While in the mated position, one or more embodiments of the top half 130 and the bottom half 140 define an interior space 220. In one embodiment, the interior space 220 is defined as substantially cylindrical (See FIG. 6 B). The mated top half 130 and bottom half 140 define a space 120 which has a three dimensional structure that approximates the dimensions of a section of a fishing rod. Whether or not the top half 130 and bottom half 140 are mated, the grip 120 may be mated with the bottom half 140 by screwing the bolt 200 projecting from the grip 120 into the empty space 195 that is defined by the projection 190.

As seen in FIG. 6 B, one or more embodiments of the top half 130 and the bottom half 140 of the bracket 110 comprise teeth 230 positioned on the surface that defines the interior space 135, 145, 220. The teeth 230 may be made of any hard or soft material, and may be formed in any shape or size that fits within the boundaries of the space 220 when the top half 130 and bottom half 140 of the bracket 110 are mated.

Figure 7:
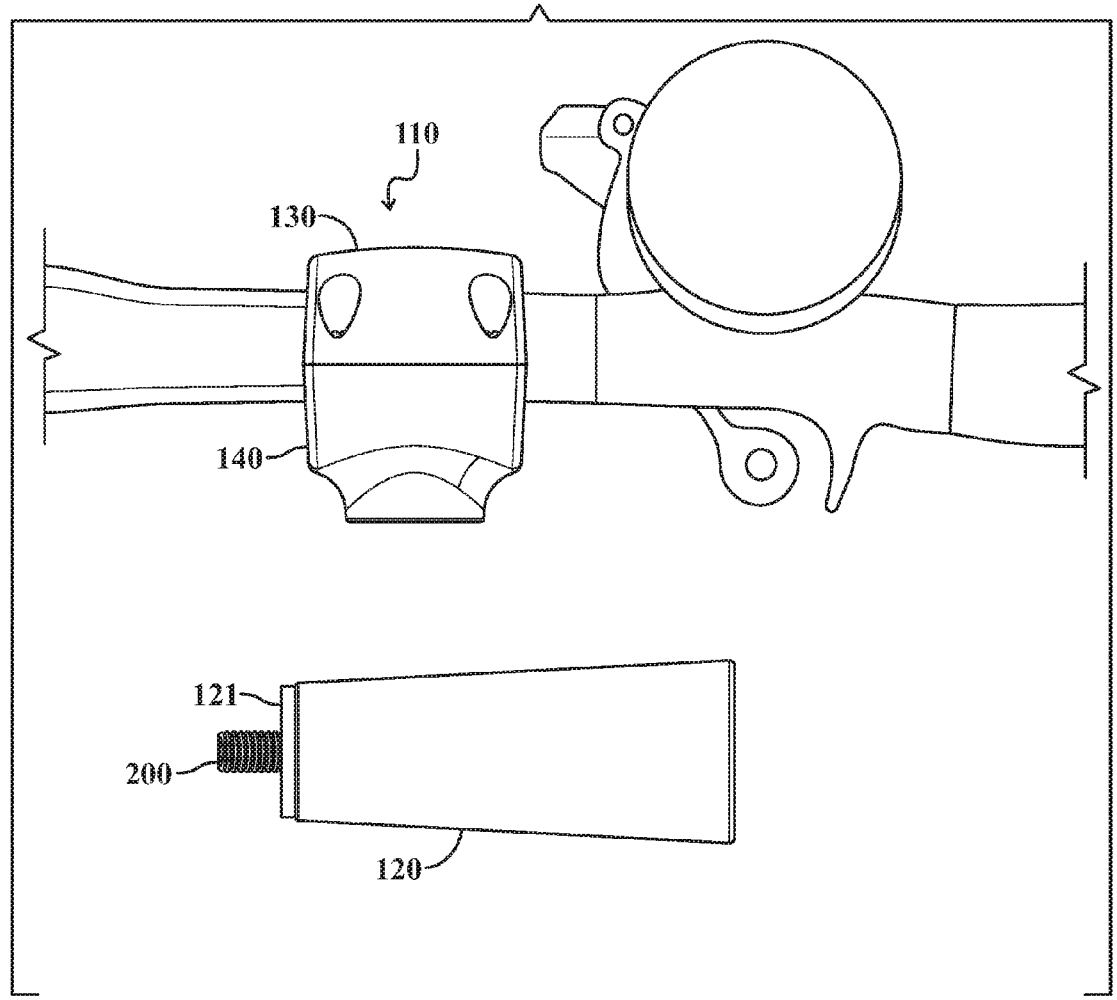
FIG. 7 illustrates a side view of a partially dissembled embodiment of the present invention.

FIG. 7 illustrates an alternative embodiment of the present invention in a partially disassembled state. As seen in FIG. 7, in one or more embodiments the grip 120 is detachable from the bracket 110. In some embodiments, the grip 120 is reversibly mated to the bracket 110 via a bolt 200 that extends from the top 121 of the grip 120. In some embodiments, the bolt 200 may be received by the bottom half 140 of the bracket 110.

In one or more embodiments of the present invention, the top half 130 and bottom half 140 may be attached to one another and/or attached to a generally rod shaped object by a permanent or non-permanent adhesive. The adhesive may be used alone or in combination with bolts that hold the top half 130 and bottom half 140 together, while girdling the generally rod shaped object. The types of possible adhesives include pastes, liquids, films, pellets, tape, hot melt, reactive hot melt, thermosetting, pressure sensitive, contact, structural, semi-structural, or non-structural adhesives.

While the invention has heretofore been described with certain degrees of particularity, there are countless configurations for the grip of the present invention. FIG. 1 through FIG. 7 illustrate only a few possible configurations, and in no way should be construed as limiting the application of the inventive apparatus to those configurations. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A grip for a generally rod shaped object comprising:
   a grip having a top and a bottom, the top of the grip adapted to receive a bolt;
   the bolt having a first end and a second end;
   a top half of a bracket having a substantially concave form defining a first interior area substantially in the shape of a half-cylinder;
   a bottom half of a bracket having a substantially concave form defining a second interior area substantially in the shape of a half-cylinder;
   wherein the top half and the bottom half are reversibly mated, a flat part of the first interior area junctioning with a flat part of the second interior area to form a single interior area substantially in the shape of a cylinder adapted to receive the object;
   wherein the top of the grip is reversibly mated with the first end of the bolt and either the top half or the bottom half are reversibly mated with the second end of said bolt,
   wherein the top half defines one or more individual through-holes and the bottom half defines one or more individual receptor holes, the one or more individual through-holes being aligned with the one or more individual receptor holes;
   wherein the one or more receptor holes are adapted to receive one or more bolts having a head region and a threaded region;
   wherein the to half and the bottom half are reversibly held in the mated position by the one or more individual bolts that pass through the one or more individual through-holes and the threaded region thereof substantially received b the one or more individual receptor holes; and
   wherein the individual through-holes of the top half are low-relief, such that the head of the one or more bolts are below an upper surface of the top half when the top half and bottom half are mated by the one or more bolts.

2. The grip for a generally rod shaped object of claim 1, further comprising a flexible material attached to the concave side of the top half and the bottom half.

3. The grip for as generally rod shaped object of claim 2, further comprising a clasp enhancing material attached to the outer surface of the grip.

4. The grip for a generally rod shaped object of claim 3, further comprising support beams attached to each of the top half, the bottom half, and the grip.

5. The grip for a generally rod shaped object of claim 4, wherein the grip is substantially frustoconical in shape.

6. The grip for as generally rod shaped object of claim 5, wherein the grip defines an interior hollow space.

7. The grip for a generally rod shaped object of claim 6, wherein the top half, the bottom half, and the grip are plastic.

8. The grip for a generally rod shaped object of claim 7, wherein the generally rod shaped object is a fishing rod and wherein the dimensions of the top half and bottom half are adapted to girdle the fishing rod.

9. The grip for a generally rod shaped object of claim 8, wherein the grip is adapted to receive a heating element and power supply.

10. The grip for as generally rod shaped object of claim 8, wherein the grip is adapted to receive a cooling element and power supply.

11. The grip for a generally rod shaped object of claim 8, wherein the grip is adapted to receive a packet of chemicals for an exothermic reaction.

12. The grip for a generally rod shaped object of claim 8, wherein the grip is adapted to receive a packet of chemicals for an endothermic reaction.

13. The grip for a generally rod shaped object of claim 1, wherein the top half and bottom half are permanently mated and permanently affixed to a substantially rod shaped portion of the generally rod shaped object.

14. The grip for a generally rod shaped object of claim 13, wherein the dimensions of the top half and bottom half are adapted to girdle the substantially rod-shaped portion of the object, and wherein the generally rod shaped object is selected from the group consisting of brooms, shovels, rakes, hoes, tampers, picks, axes, crowbars, prybars, tree pruners, fruit pickers, sidewalk scrapers, post-hole diggers, pole saws, sickles, grass hooks, pitch forks, garden tillers, ground aerators, and root irrigators.

15. The grip for a generally rod shaped object of claim 1, wherein the generally rod shaped object is a barrel or forestock of a rifle, and wherein the dimensions of the top half and bottom half are adapted to girdling the barrel or forestock of the rifle.

16. The grip for a generally rod shaped object of claim 1, wherein the generally rod shaped object is a paint roller extension pole, and wherein the dimensions of the top half and bottom half are adapted to girdle the paint roller extension pole.

17. The grip for a generally rod shaped object of claim 1, wherein the handle can be removed manually by unscrewing the grip and bolt from the bottom half.

18. A grip for a generally rod shaped object comprising:
a grip having a top and a bottom, the top of the grip adapted to receive a bolt;
the bolt having a first end and a second end;
a top half of a bracket having a substantially concave form defining a first interior area substantially in the shape of a half-cylinder;
a bottom half of a bracket having a substantially concave form defining a second interior area substantially in the shape of a half-cylinder;
wherein the top half and the bottom half are reversibly mated, a flat pan of the first interior area junctioning, with a flat part of the second interior area to form a single interior area substantially in the shape of a cylinder adapted to receive the object;
wherein the top grip is reversibly mated with the first end of the bolt and either the top half or the bottom half are reversibly mated with the second end of said bolt; and
wherein the top half and bottom half are held together by an adhesive.

* * * * *